United States Patent
Pillay et al.

(10) Patent No.: US 9,898,269 B2
(45) Date of Patent: *Feb. 20, 2018

(54) BUILD DEPLOYMENT AUTOMATION FOR INFORMATION TECHNOLOGY MANGEMENT

(71) Applicant: Bank of America Corporation, Charlotte, NC (US)

(72) Inventors: Sanjay Pillay, Round Rock, TX (US); Anton Sumin, New York, NY (US); Piedad L. Burnside, Hicksville, NY (US)

(73) Assignee: Bank of America Corporation, Charlotte, NC (US)

( * ) Notice: Subject to any disclaimer, the term of this patent is extended or adjusted under 35 U.S.C. 154(b) by 123 days.

This patent is subject to a terminal disclaimer.

(21) Appl. No.: 15/006,544

(22) Filed: Jan. 26, 2016

(65) Prior Publication Data

US 2016/0139916 A1    May 19, 2016

Related U.S. Application Data

(63) Continuation of application No. 14/195,383, filed on Mar. 3, 2014, now Pat. No. 9,323,513.

(51) Int. Cl.
  *G06F 9/44* (2006.01)
  *G06F 9/45* (2006.01)
  *G06F 9/445* (2006.01)

(52) U.S. Cl.
  CPC .......... *G06F 8/60* (2013.01); *G06F 8/41* (2013.01); *G06F 8/65* (2013.01); *G06F 8/70* (2013.01); *G06F 8/71* (2013.01)

(58) Field of Classification Search
  CPC ............. G06F 8/60; G06F 8/70; G06F 8/71
  See application file for complete search history.

(56) References Cited

U.S. PATENT DOCUMENTS 5,995,756 A    11/1999   Herrmann
7,290,262 B2   10/2007   Blizniak et al.
(Continued)

OTHER PUBLICATIONS

Rossberg, J., et al., Pro Application Lifecycle Management with Visual Studio 2012, Chapter 26: Build Automation, 2012, pp. 433-487, [retrieved on Feb. 25, 2016], Retrieved from the Internet: <URL:http://link.springer.com/chapter/10.1007/978-1-4302-4345-8_26>.*

(Continued)

*Primary Examiner* — Geoffrey St Leger
(74) *Attorney, Agent, or Firm* — Banner & Witcoff, Ltd.; Michael A. Springs (57) ABSTRACT

A computer-executable mechanism captures code modifications for a computer-executable process from a development environment into build packages that may be deployed onto specified target environments with trace, audit, code compliance and rollback options from one single web portal. The mechanism supports build package code changes from different sources, automated test of the resulting build packages, and phantom source control of all packaged code base to reduce the burden on developers to manually source control code. The computer-executable mechanism supports a portal web server for building and deploying build packages to render user responses to configurable actions that may be passed on to a job sequencer to execute a series of jobs. A computer-executable roll-back mechanism takes a snapshot of the target environment prior to deployment of a build package so that a complete release rollback or an incremental release rollback may occur as needed.

20 Claims, 10 Drawing Sheets

(56) References Cited

U.S. PATENT DOCUMENTS

| | | | |
|---|---|---|---|
| 8,285,662 B2 | 10/2012 | Bitonti et al. | |
| 8,510,842 B2 | 8/2013 | Amit et al. | |
| 8,533,676 B2 | 9/2013 | Watters et al. | |
| 8,677,315 B1* | 3/2014 | Anderson | G06F 8/60 717/101 |
| 2003/0220993 A1 | 11/2003 | Blizniak et al. | |
| 2004/0176968 A1 | 9/2004 | Syed et al. | |
| 2005/0204356 A1 | 9/2005 | Sundararajan et al. | |
| 2008/0209399 A1 | 8/2008 | Bonnet et al. | |
| 2009/0131790 A1 | 5/2009 | Munrow et al. | |
| 2009/0300580 A1* | 12/2009 | Heyhoe | G06F 8/71 717/106 |
| 2010/0191690 A1 | 7/2010 | Bitonti et al. | |
| 2010/0281455 A1 | 11/2010 | Anand et al. | |
| 2011/0184910 A1 | 7/2011 | Love et al. | |
| 2011/0231471 A1 | 9/2011 | Kudikala et al. | |
| 2011/0296386 A1* | 12/2011 | Woollen | G06F 8/70 717/124 |
| 2012/0066674 A1 | 3/2012 | Xie | |
| 2012/0117532 A1* | 5/2012 | Knepper | G06F 8/61 717/101 |
| 2012/0130906 A1 | 5/2012 | Klinker et al. | |
| 2012/0144378 A1* | 6/2012 | Shah | G06F 8/60 717/170 |
| 2012/0198416 A1 | 8/2012 | Sirr et al. | |
| 2012/0246616 A1 | 9/2012 | Frontiero et al. | |
| 2012/0246617 A1 | 9/2012 | Frontiero et al. | |
| 2012/0246618 A1* | 9/2012 | Schatz | G06F 8/71 717/122 |
| 2012/0266246 A1 | 10/2012 | Amit et al. | |
| 2012/0266248 A1 | 10/2012 | Amit et al. | |
| 2013/0091491 A1 | 4/2013 | Koutyrine et al. | |
| 2013/0174117 A1 | 7/2013 | Watters et al. | |
| 2013/0174122 A1 | 7/2013 | Watters et al. | |
| 2013/0174124 A1 | 7/2013 | Watters et al. | |
| 2013/0198717 A1* | 8/2013 | Igelka | G06F 8/71 717/121 |
| 2013/0332916 A1 | 12/2013 | Chinn et al. | |
| 2014/0032172 A1 | 1/2014 | McCarthy et al. | |
| 2015/0199188 A1 | 7/2015 | Mantripragada et al. | |

OTHER PUBLICATIONS

Ragunath, PK., et al., Evolving a New Model (SDLC Model-2010) for Software Development Life Cycle (SDLC), IJCSNS International Journal of Computer Science and Network Security, vol. 10 No. 1, Jan. 2010, pp. 112-119, [retrieved on Feb. 25, 2016], Retrieved from the Internet: <URL:http://paper.ijcsns.org/07__book/201001/20100115.pdf>.*

Rossberg, J., et al., Pro Application Lifecycle Management with Visual Studio 2012, Chapter 26: Build Automation, 2012, pp. 433-487, [retrieved on Feb. 25, 2016], Retrieved from the Internet: <URL:http://link.springer.com/chapter/10.1007/978-1-4302-4345-8_26>.

Ragunath, PK., et al., Evolving a New Model (SDLC Model-2010) for Software Development Life Cycle (SDLC), IJCSNS International Journal of Computer Science and Network Security, vol. 1 O No. 1, Jan. 2010, pp. 112-119, [retrieved on Feb. 25, 2016], Retrieved from the Internet: <URL:http://paper.ijcsns.org/07 book/201001/20100115.pdf>.

* cited by examiner

BUILD DEPLOYMENT AUTOMATION FOR INFORMATION TECHNOLOGY MANGEMENT

CROSS REFERENCE TO RELATED APPLICATION

This application is a continuation of U.S. application Ser. No. 14/195,383 filed on Mar. 3, 2014, entitled "Build Deployment Automation for Information Technology Management," which is incorporated herein by reference in its entirety.

FIELD

Aspects described herein relate to a computer system that captures code modifications for a computer-executable process from a development environment into build packages that may be deployed onto specified target environments.

BACKGROUND

A business often uses a service management system to maintain computer processes in order to enhance and customize features according to the dynamic nature of the business. Because of the complex nature of the processes, maintenance of the computer processes typically requires that a number of software developers submit separate software code changes using different development mechanisms through the service management system.

The procedures to build and to migrate enhancements of the business processes from the submitted software code changes is often very manual in nature and error prone with respect to basic tractability and auditing.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses in a computer-executable mechanism (e.g., computer system) captures code modifications for a computer-executable business process from a development environment into build packages that can be deployed onto various target environments, with complete traceability, audit, code compliance and rollback option from one single portal with elevated security mechanism.

In accordance with various aspects of the embodiments, build package code changes may be obtained from various sources such as propriety object code, data loads, structured query language (SQL) code, and the like. Also, a computer-executable mechanism may support automated test of the resulting build packages.

According to one or more aspects, a computer-executable mechanism may support phantom source control of packaged code base to reduce the burden on developers to manually source control code. In accordance with various aspects of the embodiments, a phantom source control robot may automatically identify objects that were changed and source control them.

According to one or more aspects, a computer-executable mechanism may notify a software development lifecycle (SDLC) systems on the current status of the build.

According to one or more aspects, a computer-executable build and deployment engine provides security control for an actionable feature with an appropriate access level. A versioning mechanism may provide incremental deployments to various target environments, thus circumventing the manual overhead of keeping track of what code was deployed to which environment.

According to one or more aspects, a computer-executable mechanism supports a portal web server for building and deploying build packages. A custom application server provides a mechanism to bind XML feeds to HTML web pages and render user responses to configurable actions that may be passed on to a job sequencer to execute a series of jobs.

According to one or more aspects, a computer-executable roll-back mechanism takes a snapshot (for example, based on the build manifest object list) of the target environment prior to deployment of a build package. The snapshot includes only objects that are modified (for example, based on manifest file) and consequently are backed up. This approach for snapshot backup provides a complete release rollback or an incremental release rollback as needed.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the disclosure will occur to persons of ordinary skill in the art from a review of this disclosure. For example, one of ordinary skill in the art will appreciate that the steps illustrated herein may be performed in other than the recited order, and that one or more steps illustrated may be optional in accordance with aspects of the disclosure.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

In accordance with various aspects of the embodiments, a computer-executable mechanism (e.g., computer system) captures code modifications for a computer-executable business process from a development environment into build packages that may be deployed onto various target environments, with traceability, audit, code compliance and rollback options from one single portal with elevated security mechanisms.

In accordance with various aspects of the embodiments, build package code changes may be obtained from various sources providing propriety object code, data loads, structured query language (SQL) code, and the like. Also, a computer-executable mechanism may support an automated test of the resulting build packages as well as phantom source control that automatically identifies objects that were changed and source control them. For example, source control may comprise a software versioning mechanism of source code, where the build deployment engine integrates to leverage the source control feature.

The computer-executable mechanism may support phantom source control of all packaged code base to reduce the burden on developers to manually source control code. Traditional source control may require a developer to manually check out and check in the source code to manage source control. However, in accordance with various aspects of the embodiments, the build deployment engine process automates the process of source control by performing the code check out and check in without direct involvement of the developer (in other words, transparently to the developer). A phantom source control robot may automatically identify objects that were changed and source control them.

In accordance with various aspects of the embodiments, a computer-executable roll-back mechanism takes a snapshot of the target environment prior to deployment of a build package. The snapshot includes only objects that are modified and consequently are backed up. This approach for snapshot backup provides a complete release rollback or an incremental release rollback as needed.

In accordance with various aspects of the embodiments, a computer-executable mechanism supports a portal web server for building and deploying build packages. A custom application server provides a mechanism to bind XML feeds to HTML web pages and render user responses to configurable actions that may be passed on to a job sequencer to execute a series of jobs.

As discussed in the following description, a component is an independent software module that can be built and deployed independently and may be formed from one or more objects (artifacts). An object (which may be referred as an artifact) is an individual item that makes up a component and may include source code, documentation, binary code, text file, XML, file, and the like. An artifact type is a categorization of an object (artifact), where an appropriate handler may support the given artifact type.

Figure 1:
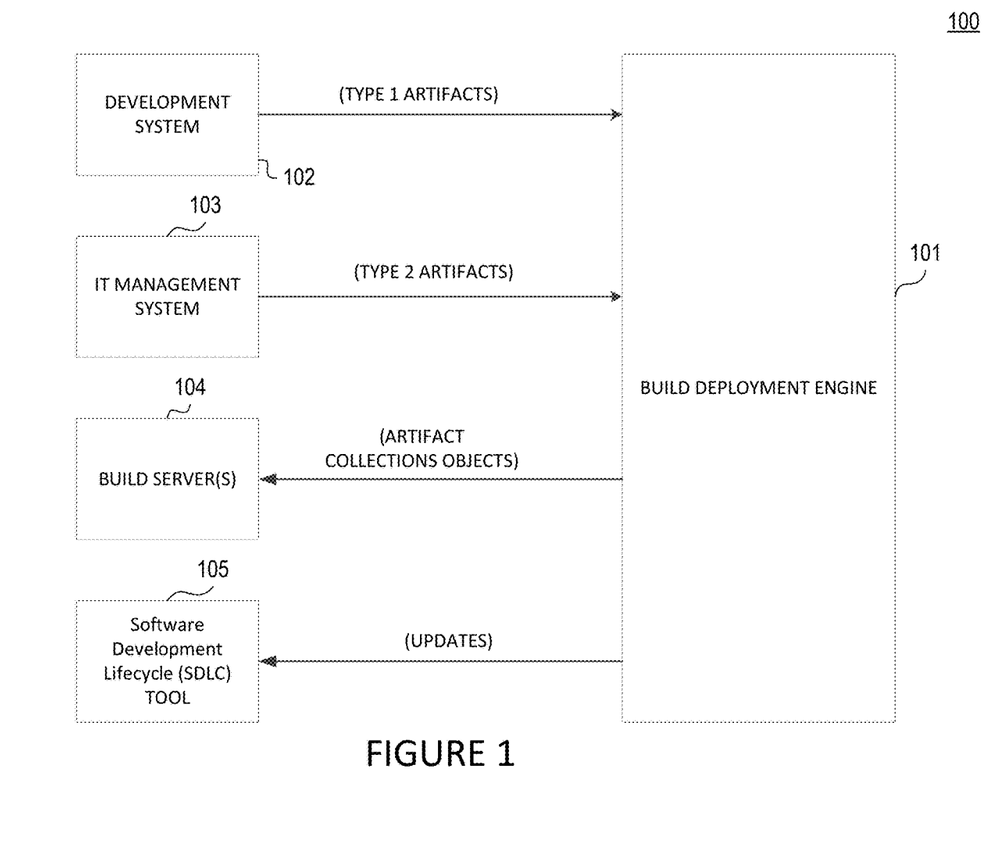
FIG. 1 shows a computer system for creating a build package from software artifacts according to one or more aspects of the present disclosure.

FIG. 1 shows computer system 100 for creating a build package from software artifacts according to one or more aspects of the present disclosure. Computer system 100 supports packaging objects into a packing list in an automated manner. Traditional systems typically require software developers to manually create a packing list, export the packing list, and manually hand them over to builds or deployment personnel (which in most cases is done by a separate entity). Also, traditional systems may require that artifacts from a different sources to be separately and manually extracted and transferred to the build and deployment processes.

According to one or more aspects, computer system 100 introduces a custom tagging mechanism for building packages from development system 102 and analyzes the packages to be built based on configurable criteria. Also, computer system 100 supports a mechanism to accumulate additional artifacts (e.g., SQL files, data load files or integrator files) by build deployment engine 101 from development system 102 into a package with the artifacts from information technology (IT) management system 103. All packages staged by developers may then be automatically extracted for builds and numbered according to configurable releases. All the artifacts (objects) in the build package are also captured into a manifest file for further use in deployment and/or rollback activities.

Figure 5:
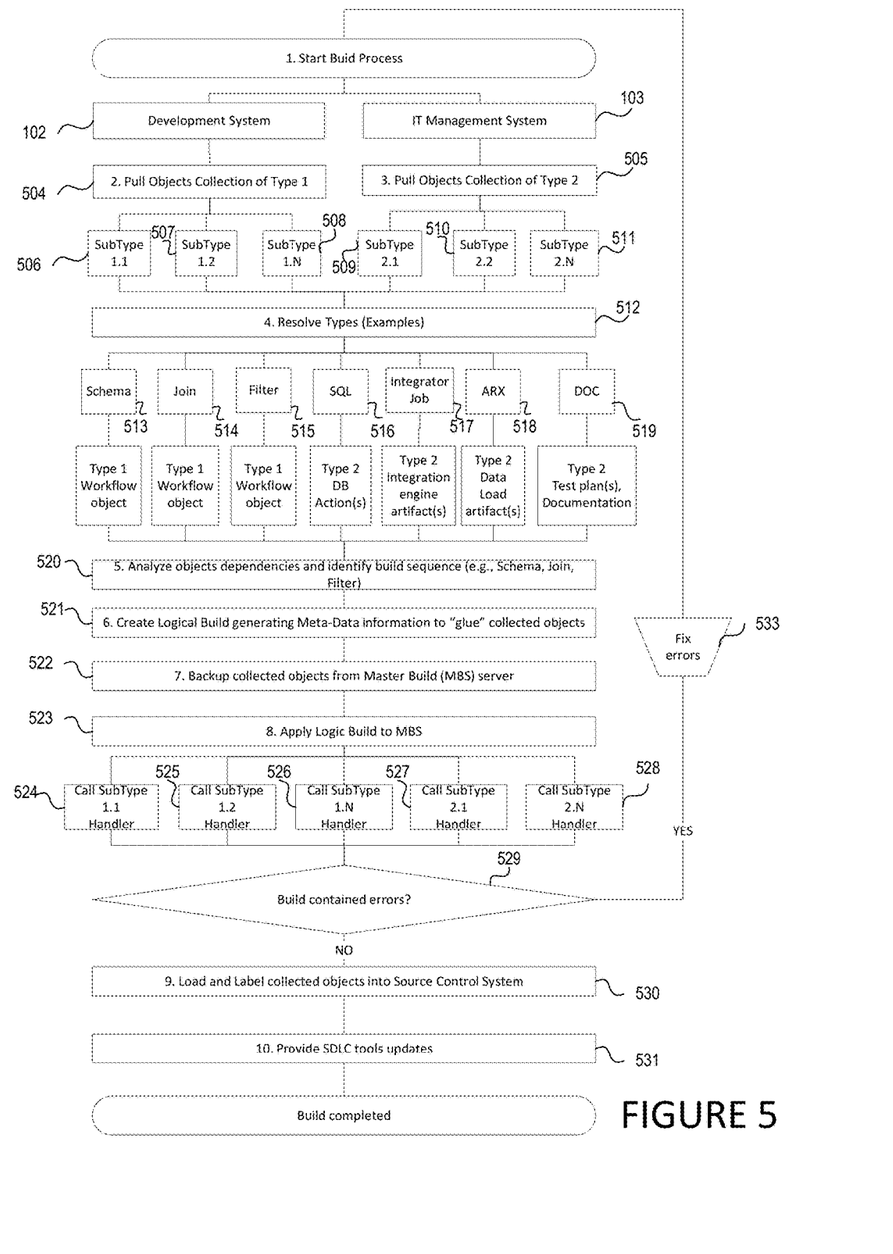
FIG. 5 shows an example for creating a build package from software artifacts according to one or more aspects of the present disclosure.

Build deployment engine 101 combines type 1 artifacts from development system 102 and type 2 artifacts from IT management system 103. While the embodiment shown in FIG. 1 shows two sources, more than two sources may be supported in some embodiments. The type of artifact corresponds to the specific source, where an artifact type may include different type of files (that may be denoted with different subtypes and often distinguished by different file extensions). FIG. 5 shows an example for creating a build package from different software artifacts, where type 1 artifacts include schema, join, and filter artifacts and types 2 artifacts include sql, integrator job, arx, and doc artifacts.)

As will be discussed with FIG. 4, build deployment engine 101 processes the type 1 and type 2 artifacts to provide build server 104 with build source data for deployment on a target computing device (e.g., target server) and notify a software development lifecycle (SDLC) system 105 about the current status of the build.

Figure 2:
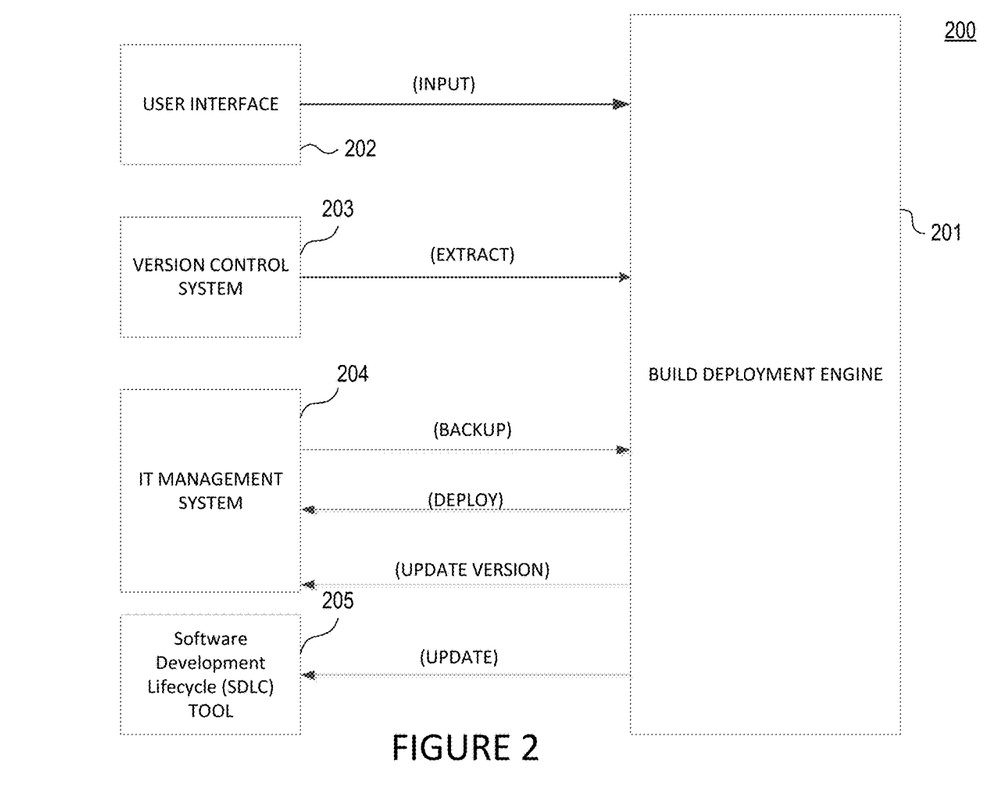
FIG. 2 shows a computer system for deploying a build package for a target server according to one or more aspects of the present disclosure.

FIG. 2 shows computer system 200 for deploying a build package for a target server according to one or more aspects of the present disclosure. Computer system 200 may share one or more elements with computer system 100 that creates a build package from software artifacts based on the build version and current version of one or more components at the target server. Also, build deployment system 101 and build deployment system 201 may be implemented on the same computing platform.

Figure 8:
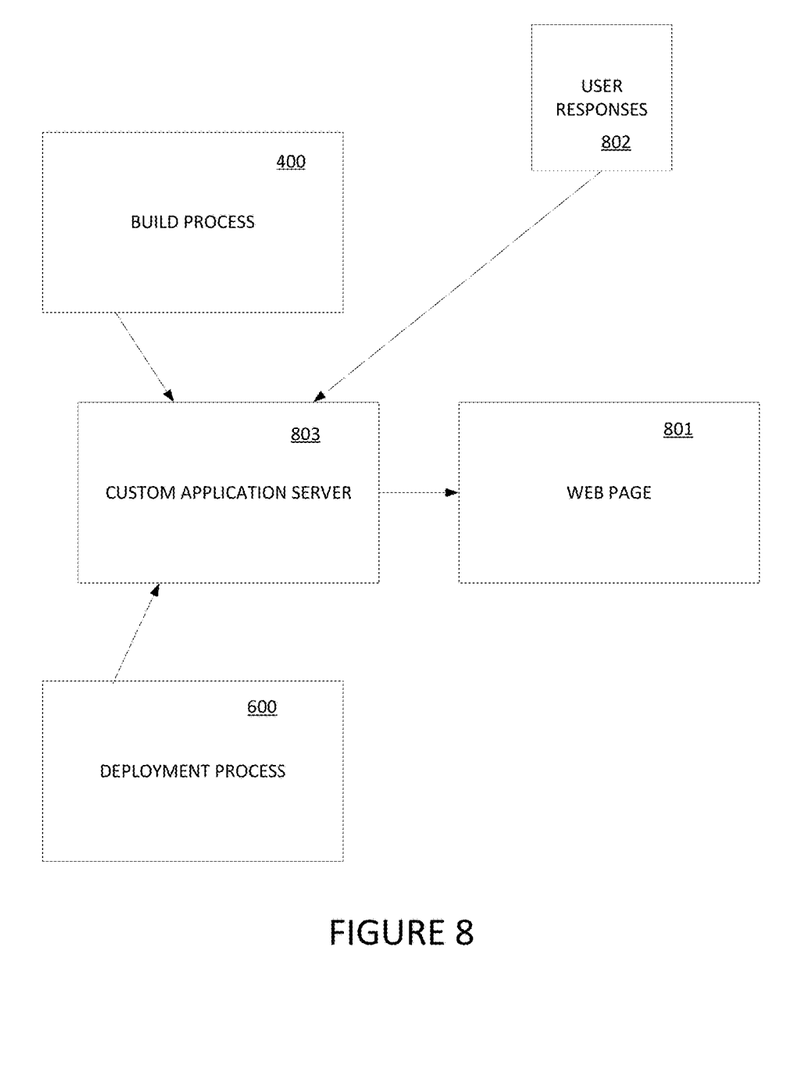
FIG. 8 shows a system for generating a web page when building and/or deploying a build package according to one or more aspects of the present disclosure.

Build deployment engine 201 extracts build packages staged for a build from version control system 203 (which may correspond to build server 104 as shown in FIG. 1) based on user inputs through user interface 202 (for example via web page 801 as shown in FIG. 8). The extracted code artifacts may run through an automated test deployment engine (not explicitly shown in FIG. 2) passing builds that are appropriately numbered and packaged into a deployable build package for a selected target server (for example, located at IT management system 204) as shown in FIG. 2. As will be further discussed with FIG. 6, existing artifacts (objects) may be backed up from the selected target server for a situation in which a deployed build package must be retracted from the selected target server and restored to the previous configuration.

Build deployment engine 201 provides status of deployment activity to SDLC tool 205 and may also send out automated notifications to users that are involved (registered) with the respective deployment requirement.

Engines 101 and 201 may provide security control for an actionable feature at the right access level for operation. A versioning mechanism may be supported to provide incremental deployments to specified target environments and to circumvent the manual overhead of keeping track of what code was deployed to which environment. An administration utility may provide additional controls to secure target environments and release cycles. A configurable multistage stage deployment engine may also provide the function of deploying artifacts in a desired sequence.

Figure 3:
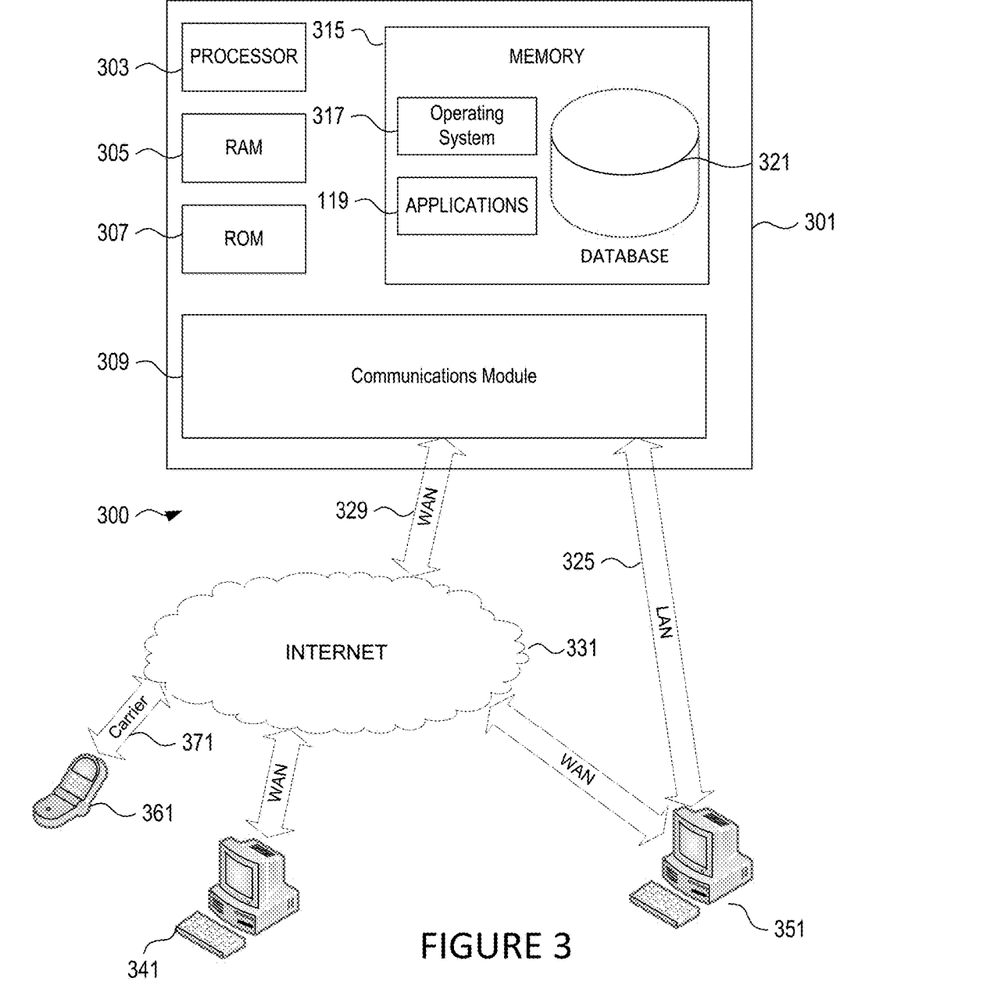
FIG. 3 illustrates an example of a suitable computing system environment that may be used according to one or more illustrative embodiments.
Figure 6:
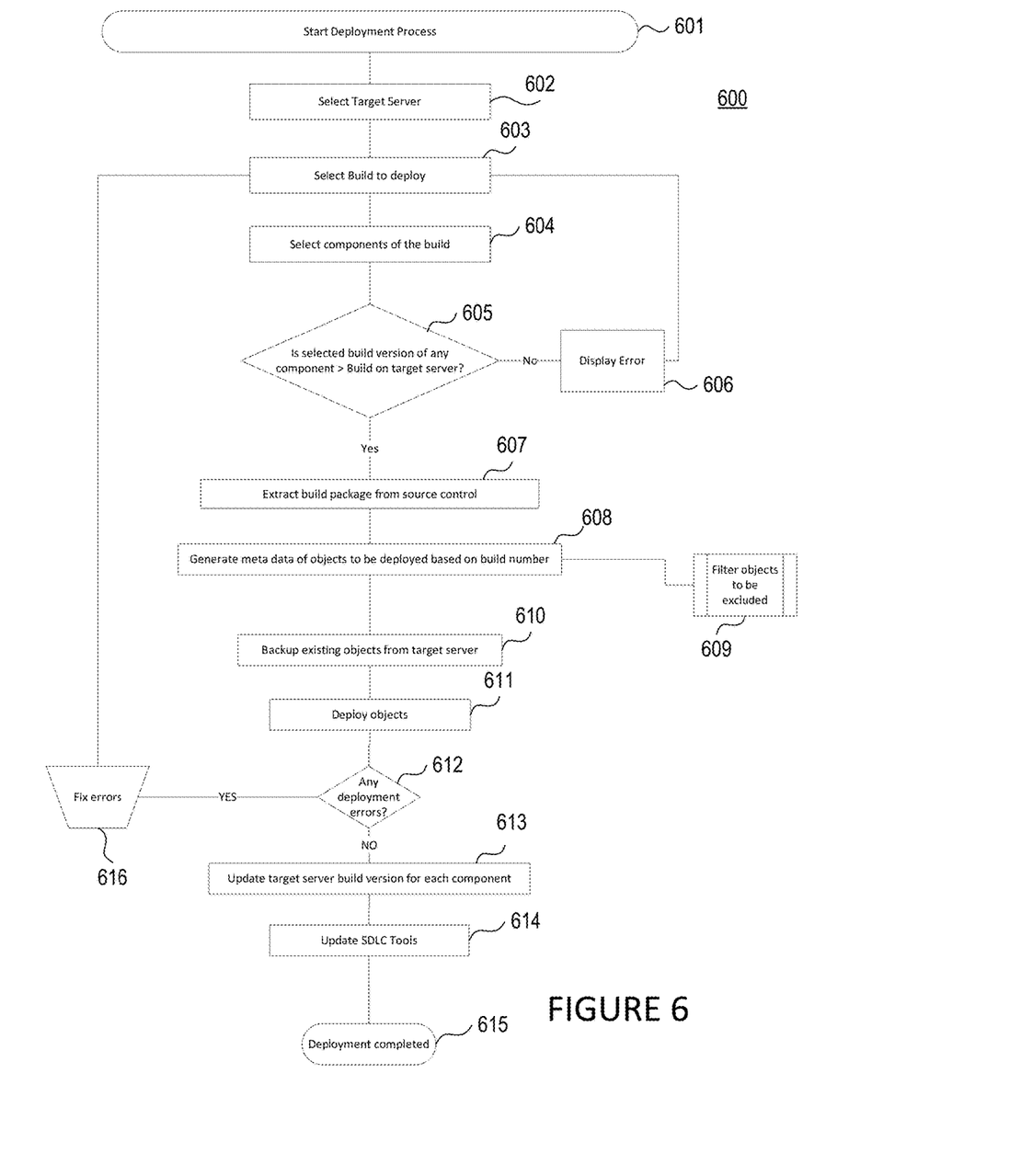
FIG. 6 shows a process for deploying a build package for a target server according to one or more aspects of the present disclosure.
Figure 9:
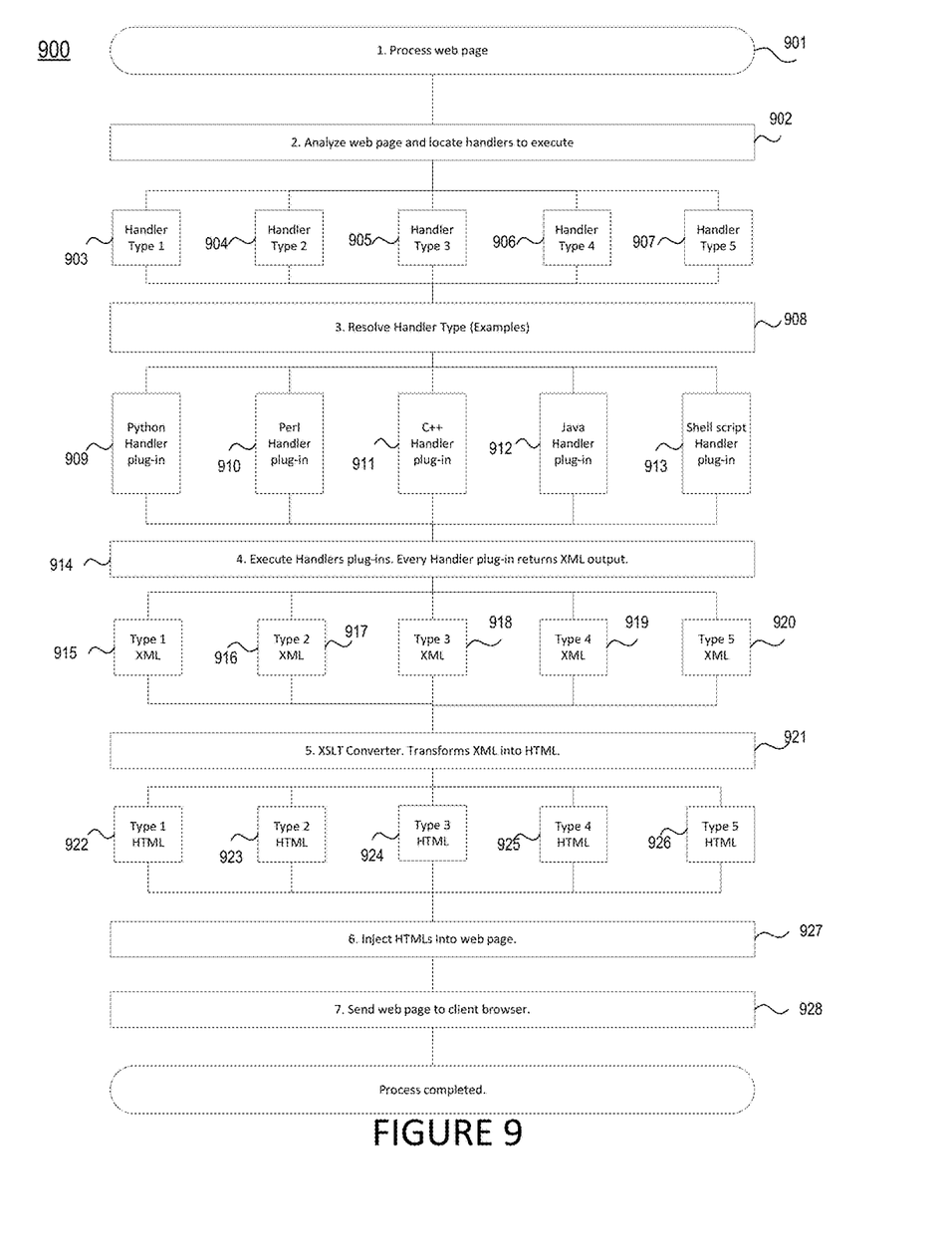
FIG. 9 shows a process for generating a web page when building and/or deploying a build package according to one or more aspects of the present disclosure.

FIG. 3 illustrates an example of a suitable computing system environment that may be used according to one or more illustrative embodiments. FIG. 3 illustrates an example of a suitable computing system environment 300 that may be used according to one or more illustrative embodiments. For example, as will be further discussed, computing system environment 300 may support processes 400, 600, and 900 as shown in FIGS. 4, 6, and 9, respectively, to support a financial transaction system. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 3, the computing system environment 300 may include a computing device 301 wherein the processes discussed herein may be implemented. The computing device 301 may have a processor 303 for controlling overall operation of the computing device 301 and its associated components, including random-access memory (RAM) 305, read-only memory (ROM) 307, communications module 309, and memory 315. Computing device 301 typically includes a variety of computer readable media. Computer readable media may be any available media that may be accessed by computing device 301 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 301.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 300 may also include optical scanners (not shown). Exemplary usages include scanning and converting paper documents, e.g., correspondence and receipts to digital files.

Although not shown, RAM 305 may include one or more are applications representing the application data stored in RAM 305 while the computing device is on and corresponding software applications (e.g., software tasks), are running on the computing device 301.

Communications module 309 may include a microphone, keypad, touch screen, and/or stylus through which a user of computing device 301 may provide input, and may also include one or more of a speaker for providing audio output and a video display device for providing textual, audiovisual and/or graphical output.

Software may be stored within memory 315 and/or storage to provide instructions to processor 303 for enabling computing device 301 to perform various functions. For example, memory 315 may store software used by the computing device 301, such as an operating system 317, application programs 319, and an associated database 321. Also, some or all of the computer executable instructions for computing device 301 may be embodied in hardware or firmware.

Computing device 301 may operate in a networked environment supporting connections to one or more remote computing devices, such as computing devices 341, 351, and 361. The computing devices 341, 351, and 361 may be personal computing devices or servers that include many or all of the elements described above relative to the computing device 301. Computing device 361 may be a mobile device communicating over wireless carrier channel 371.

The network connections depicted in FIG. 3 include a local area network (LAN) 325 and a wide area network (WAN) 329, but may also include other networks. When used in a LAN networking environment, computing device 301 may be connected to the LAN 325 through a network interface or adapter in the communications module 309. When used in a WAN networking environment, the computing device 301 may include a modem in the communications module 309 or other means for establishing communications over the WAN 329, such as the Internet 331 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 319 used by the computing device 301, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 301. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 301. Such a processor may execute computer-executable instructions stored on a computer-readable medium.

Figure 4:
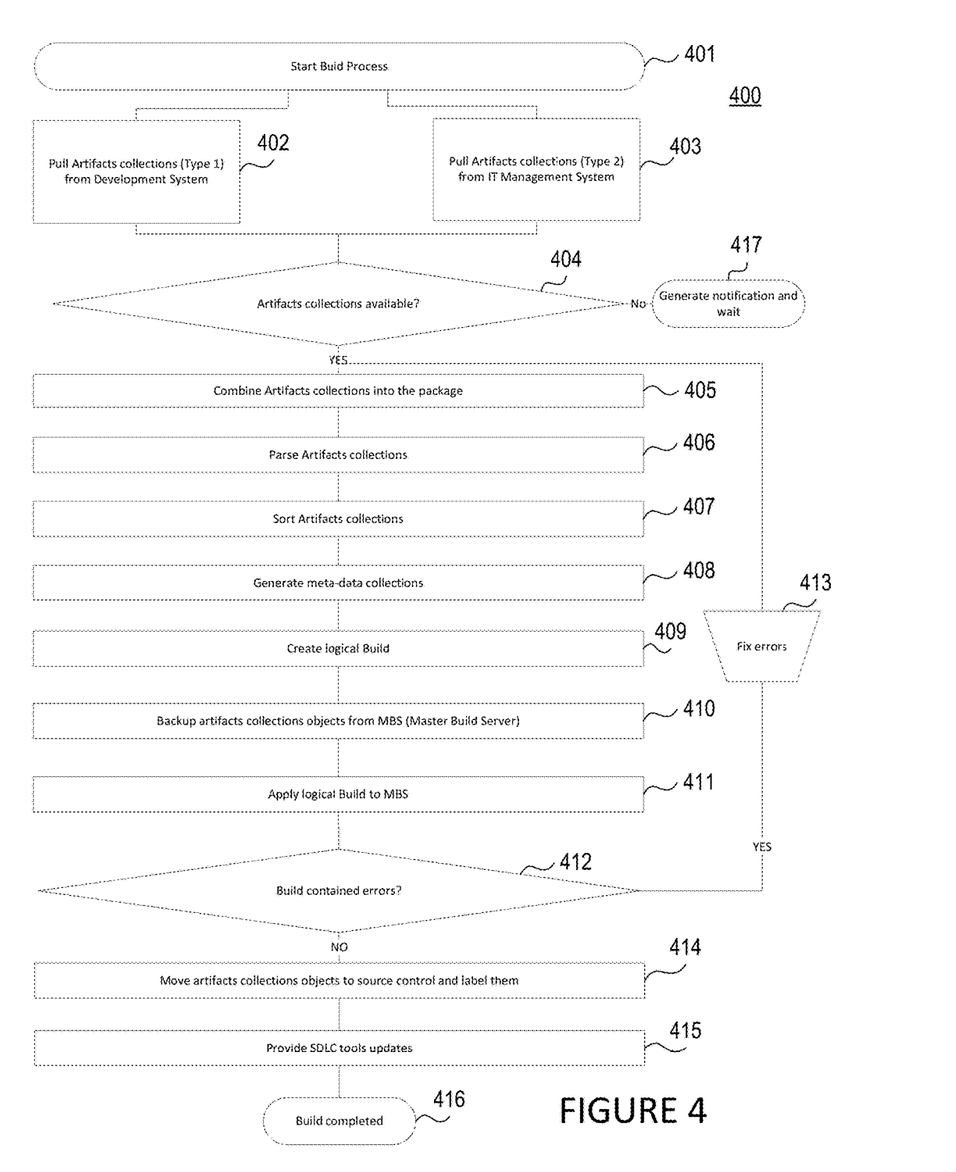
FIG. 4 shows a process for creating a build package from software artifacts according to one or more aspects of the present disclosure.

FIG. 4 shows process 400, as executed by build deployment engine 101, for creating a build package from software artifacts according to one or more aspects of the present disclosure. A developer initiates build process 400 at block 401 through a web portal (e.g., web page 801) so that a first artifact collection (type 1) is pulled from development system 102 and a second artifact collection (type 2) is pulled from IT management system 103 at blocks 402 and 403, respectively.

At block 404, if all of the artifacts are not available, block 417 is executed to inform the developer about the situation while build deployment engine 101 waits for the missing artifacts. Otherwise, at block 405, the artifact collections are combined and then processed at blocks 406-407 to parse and sort the artifacts, respectively. Build engine 102 determines data dependencies among the artifacts and, for example, verifies whether all data definitions are provided.

Build information about the artifacts in the build is included in metadata at block 408. The metadata generated in process 400 comprises a set of attributes that describes build artifacts type and physical location. This metadata may be used to form a logical build. The logical build is a combination of build artifacts and artifacts metadata description, in which the metadata provides a dictionary (which may be referred as a manifest list) listing all the artifacts included into the build and describing object properties such as type and physical location. Compared to the logical build, a physical build is an approach to apply build artifacts contained in a build manifest to the target build server. The deployment process may be based on top of build manifest that is used to identify objects from the build artifacts collection to deploy to the target server. At block 409, the logical build is created based on the generated metadata.

With traditional systems, existing code may be lost at build servers 104 (as shown in FIG. 1) if a system restore or database restore occurs. In such a situation, a developer may need to manually source control code. To address this deficiency, build deployment engine 101 may backup existing artifacts at build servers 104 at block 410 before applying the logical build at block 411. For example, a phantom source control robot may automatically identify artifacts (objects) that were changed during the build process and source control them. This approach provides an audit trail of code changes to the system and may consequently provide a more robust source control than traditional approaches.

At block 412, process 400 determines whether any errors are detected in the logical build. For example, data may be missing or inconsistent between different artifacts. If an error is detected, the error is fixed at block 413, which may include manual intervention by a developer. The logical build that is applied to the master build server (MBS) may potentially contain errors due to a MBS inconsistency state or missing data elements. Typically, a manual process is performed in such a case to fix this type of error due to the error nature. If there are no detected errors, the artifact collections are moved to build server 104 (source control) and labeled at block 414, and SDLC tool 105 is updated at block 415. Build artifacts are labeled when placed into the version control system such as assigning a tag to indicate that a logical build is successfully being deployed to the master build server and version control system.

FIG. 5 shows an example for creating a build package from software artifacts in accordance with process 400 as shown in FIG. 4. Type 1 artifacts and type 2 artifacts are pulled from development system 102 and IT management system 103 at blocks 504 and 505, respectively. The type 1 artifacts and type 2 artifacts may be further distinguished by sub-types 506-508 and sub-types 509-511, respectively. For example, the sub-types may be mapped to different artifact types (e.g., schema 513, join 514, filter 515, sql 516, integrator job 517, arx 518, and doc 519) and may be identified according to the file extensions of the artifacts as resolved at block 512.

At block 520, the artifacts are analyzed for dependencies and to identify build sequences, which is an approach to generate a logical identifier for separating logical builds from each other. At block 521, metadata is obtained based on the dependencies so that the artifacts (objects) can be bound ("glued") together. The metadata may include a dictionary listing all build included artifacts and containing attributes to specify build artifact type and location. Using the metadata, a logical build is then created from the metadata.

As previously discussed, the current objects at the master build server (corresponding to build servers 104 as shown in FIG. 1) are backed up at block 522 so that the logical build can be applied at the master build server at block 523. Handlers 524-528 are appropriately called for the different artifact types to determine if there are any detected errors (e.g., missing data, inconsistent data, compiler errors, and the like) at block 529. Handlers 524-528 are aware of the artifact specific internal details and how it can be deployed to master build or target server. Handlers 524-528 are executed on the master build server during the build phase and on the target server during the build deployment phase. If an error is detected, the error is fixed at block 533 (corresponding to block 413 as shown in FIG. 4); otherwise, the objects (artifacts) are loaded in the version control system at block 530 (corresponding to block 414) and SDLC tools are updated at block 531 (corresponding to block 415).

FIG. 6 shows process 600 for deploying a build package for a target server using build source data from process 400 as shown in FIG. 4. As previously discussed with FIGS. 1, 4, and 5, artifacts are collected and combined from one or more development sources. The combined artifacts are processed to determine whether there are any detected errors. If not, the combined artifacts (corresponding to the logical build) are stored at the build servers so that build data can be applied to a designated target server during the deployment process as will be discussed. For example, based on the current build version and the updated build version, the appropriate artifacts can be included in the deployed build.

Referring to FIG. 6, process 600 is initiated at block 601, for example, by a developer providing target server information at block 602 via web portal 801 as will be discussed with FIG. 8. Based on the selected deployed build version to be deployed at the target server at block 603, components (comprising one or more of the collected artifacts) are selected at block 604.

Process 600 determines whether any selected component is incompatible with the target server at block 605. If so, an error indication is displayed at block 606 (for example, via web portal 801). Otherwise, the build package, which includes the appropriate objects) are extracted at block 607 from version control system 203 as shown in FIG. 2.

Metadata is generated at block 608 based on the build number. Deployment may occur per build so a release may have many builds and build deployment process 600 may progress contingent on the build number. Based on the manifest file generated during the build process, the deployment metadata for the selected build number is generated during process 600 that has information of all the objects (artifacts) that need to be deployed with proper dependency among the artifacts. The deployment metadata may also exclude any artifacts at block 609. Because the build manifest file is used as the input for the deployment metadata, the deployment metadata may be different from the build manifest (or build metadata) file. Consequently, deployment process 600 resolves the dependency between the extracted objects and applies appropriate filters at block 609 to skip objects if required.

Process 600 takes a snapshot (which may be based on the build manifest object list) of the target environment at block 610 prior to deployment of the objects at the target server at block 611. The snapshot may sense only objects that are being modified (based on manifest file) so that the backup spans only those objects. This approach for snapshot backup may provide a complete release rollback or an incremental release rollback as needed. Deployment at block 611 may generate a deployment plan that calls specific deployment handlers (e.g., 734-738 as shown in FIG. 7) based on the corresponding artifact types.

If a deployment error is detected at block 612, the error is fixed by a developer at block 616. For example, exemplary deployment errors may include SQL execution errors, a missing dependent object, network errors, and the like. Fixes to such errors are typically performed in a manual manner by a developer. If no deployment error is detected, the target server is updated with the built component at block 613 and the SDLC tool is updated with the build information at block 614 to complete the deployment process at block 615.

An integration mechanism may be supported to provide the status of each build and deployment activity as activity progresses through the development, build and deployment life cycle. A build system may also send out automated notifications based on involved registered users.

Figure 7:
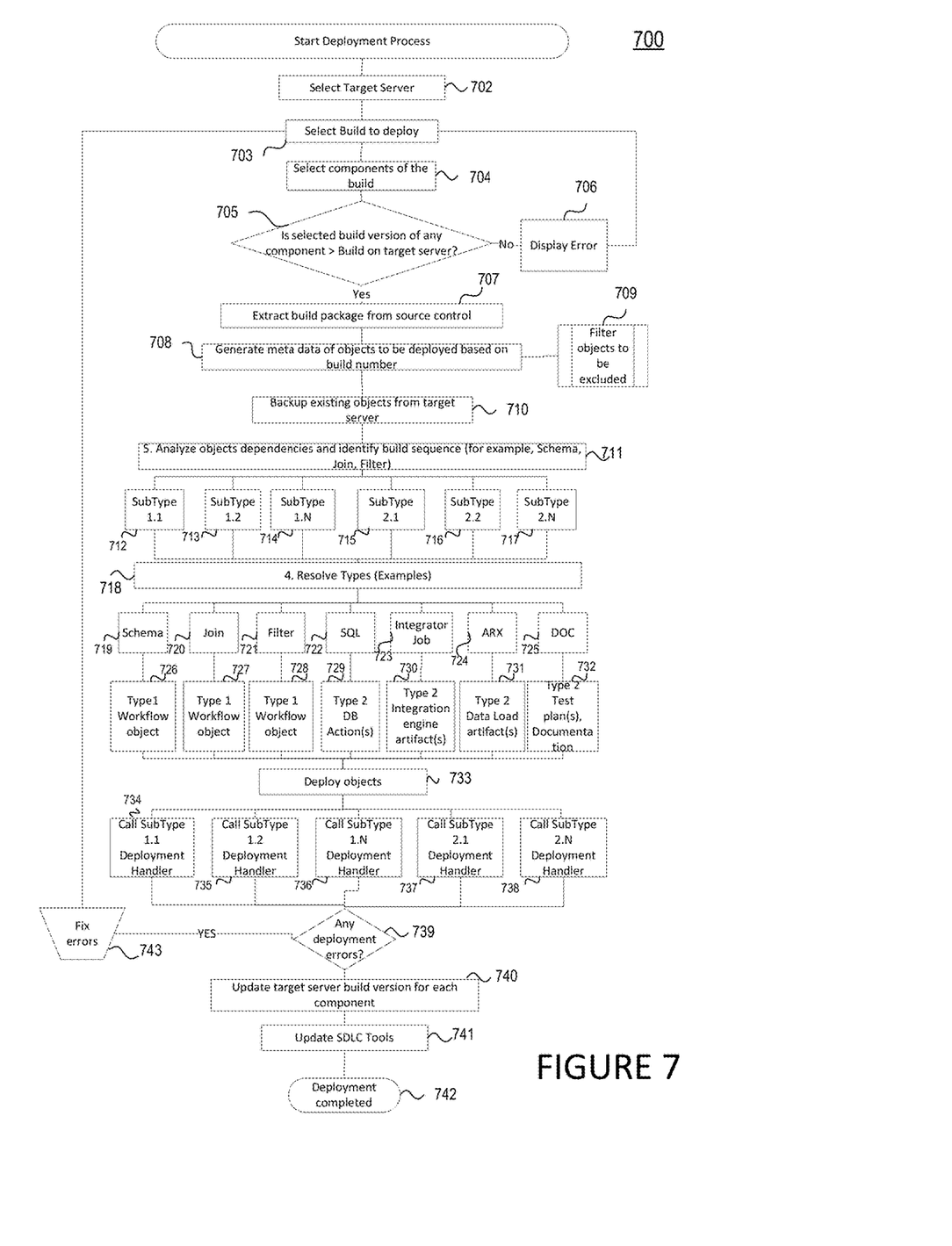
FIG. 7 shows an example for deploying a build package for a target server according to one or more aspects of the present disclosure.

FIG. 7 shows example 700 for deploying a build package at a target server in accordance with process 600 as shown in FIG. 6, where blocks 702-710, 733, and 739-743 correspond to blocks 602-610, 611, and 612-616 respectively. At blocks 711-717, the deployment process analyzes objects dependencies and identifies build sequence. Before deploying objects at block 733, the objects are resolved at blocks 718-732. In addition, once the objects are deployed, the appropriate deployment handlers 734-738 are selected based on the resolved artifact (object) types.

Figure 10:
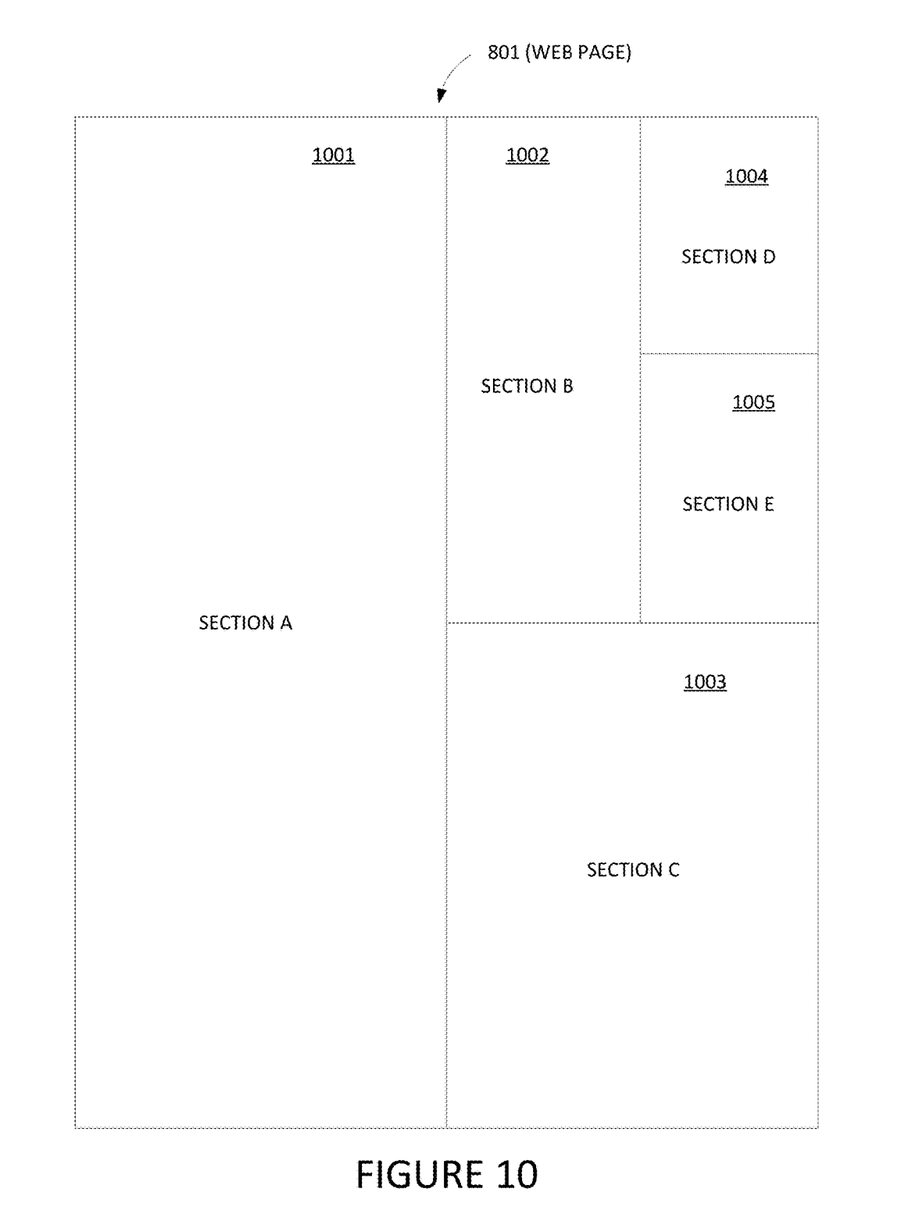
FIG. 10 shows an exemplary web page that is generated by the process depicted in FIG. 9 according to one or more aspects of the present disclosure.

FIG. 8 shows a system for generating web page 801 when building and/or deploying a build package (corresponding to processes 400 and 600, respectively) according to one or more aspects of the present disclosure. Custom application server 803 provides a mechanism to bind XML feeds to HTML web page 801 and renders user responses 802 to configurable actions that may be passed on to job sequencer to execute series of jobs. Web portal 801 (as depicted in FIG. 10) may provide a holistic view of all release builds, target environment deployment status, detail error logs and activity reports.

According to some embodiments, custom application server 803 executes process 900 (as shown in FIG. 9) to generate web page 801, where server 803 may reside on the same computing platform as build deployment engines 101 and/or 201 shown in FIGS. 1 and 2, respectively.

A job sequencer, which may be executed by server 803, is a configurable apparatus that executes platform independent automation commands (e.g., package extraction, package builds, source control, backup target state, test packages, deploy packages, restart environment, and the like) in predefined order and captures detail report of the job status and error report. The job sequencer may be configurable and flexible to execute any software job as needed.

FIG. 9 shows process 900 for generating web page 801 when building and/or deploying a build package according to one or more aspects of the present disclosure. Process 900 provides the ability to include web page handler components (corresponding to handlers 903-907 that are exemplified by exemplary handlers 909-913) into web page processing 900 that are heterogonous by their nature and may be implemented through different kinds of programming languages. Process 900 also supports the ability to inject into web page 802 multiple HTML elements independently generated through XML/XSLT transformation mechanism. XSLT (Extensible Stylesheet Language Transformations) is a language for transforming XML documents into other XML documents or other objects such as HTML for web pages, plain text, or into XSL (Extensible Stylesheet Language) formatting objects.

Process 900 is initiated at block 901 in order to analyze web page components of the web page to be generated and to locate the required handlers for each at block 902. Different web page components may be processed by different handler types 903-907 corresponding to different programing languages associated with each component. For example, handler types 903-907 map to Python handler 909, Perl handler 910, C++ handler 911, Java handler 912, and shell script handler 913, respectively as resolved at block 908.

Each handler generates XML outputs (streams) 915-920 for the web page components (corresponding to web page content) as performed at block 914. Each XML output 915-920 is then transformed into HTML elements 922-926 at block 921. HTML elements 922-926 are then injected into web page 801 at block 927. For example, in reference to FIG. 10, each HTML element may be injected into different sections 1001-1005 of web page 801 so that information content from each XML stream can be rendered. The generated web page 801 can then be sent to the user's web browser at block 928.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain business processes on behalf of the company).

What is claimed is:

1. A computer-assisted method for automating a build deployment for a software project, the method comprising:
   combining a first artifact collection with a second artifact collection, wherein the first and second collections have different artifact types;
   generating build metadata from the combined artifact collection, wherein the build metadata includes a manifest list;
   forming logical build data from the first and second artifact collections based on the build metadata;
   when no build errors are detected with the logical build data, creating a build source data for deployment;
   identifying a selected build package for deployment based on a selected target computing device, wherein the selected build package is identified by a build number;
   in response to the identifying, extracting the selected build package from the build source data;
   when building the selected build package, generating web page content through a first handler and a second handler with different programming languages, wherein the first handler and the second handler generate first and second generated outputs, respectively, that comply with a first markup language;
   transforming the first and second outputs to first and second elements, respectively, that comply with a different markup language;
   injecting the first and the second elements into a rendered web page; and
   mapping the first and second elements into a first web page section and a second web page section, respectively.

2. The computer-assisted method of claim 1, further comprising:
   parsing the combined artifact collection;
   sorting the parsed artifact collection; and
   generating the build metadata based on the parsed artifact collection.

3. The computer-assisted method of claim 1, further comprising:
   backing up artifact collection objects from a build computer device.

4. The A computer-assisted method of claim 3, further comprising:
   when no build errors are detected with the logical build data, moving the artifact collection objects to a source control computer device.

5. The computer-assisted method of claim 4, further comprising:
   updating a software development lifecycle (SDLC) system about the build source data.

6. The computer-assisted method of claim 1, further comprising:
   when a build error is detected with the logical build data, repeating the combining, the generating, and the forming.

7. The computer-assisted method of claim 1, further comprising:
   backing up existing objects from the selected target computing device based on deployment metadata.

8. The computer-assisted method of claim 1, further comprising:
   based on deployment metadata, filtering an identified object to be excluded.

9. The computer-assisted method of claim 1, further comprising:
   updating a software development lifecycle (SDLC) system about the selected build package.

10. The computer-assisted method of claim 1, further comprising:
    when a deployment error is detected, repeating the identifying, the extracting, the generating, and the resolving.

11. The computer-assisted method of claim 1, further comprising:
    determining a categorization of a selected object according to an artifact type; and
    directing the selected object to an appropriate handler.

12. The computer-assisted method of claim 1, further comprising:
    detecting a version error when a build version of a component is incompatible with a current version of the selected target computing device.

13. The computer-assisted method of claim 1, wherein the first markup language comprises an Extensible Markup Language (XML) and the different markup language comprises a HyperText Markup Language (HMTL).

14. The computer-assisted method of claim 11, the method further comprising:
    generating, from a dictionary, deployment metadata for the selected object for deployment, wherein the build metadata includes the dictionary listing all the artifacts included into a build and describing object properties of the artifacts.

15. An apparatus comprising:
    at least one memory; and
    at least one processor coupled to the at least one memory and configured to perform, based on instructions stored in the at least one memory:
    combining a first artifact collection with a second artifact collection, wherein the first and second collections have different artifact types;
    generating build metadata from the combined artifact collection, wherein the build metadata includes a manifest list;

forming logical build data from the first and second artifact collections based on the build metadata;

when no build errors are detected with the logical build data, creating a build source data for deployment;

identifying a selected build package for deployment based on a selected target computing device, wherein the selected build package is identified by a build number;

in response to the identifying, extracting the selected build package from the build source data;

when deploying the selected build package, generating web page content through a first handler and a second handler with different programming languages, wherein the first handler and the second handler generate first and second generated outputs, respectively, that comply with a first markup language;

transforming the first and second outputs to first and second elements, respectively, that comply with a different markup language;

injecting the first and the second elements into a rendered web page; and mapping the first and second elements into a first web page section and a second web page section, respectively.

16. The apparatus of claim 15, wherein the at least one processor is further configured to perform:

generating, from a dictionary, deployment metadata for a selected object for deployment, wherein the build metadata includes the dictionary listing all the artifacts included into a build and describing object properties of the artifacts.

17. The apparatus of claim 15, wherein the at least one processor is further configured to perform:

parsing the combined artifact collection;

sorting the parsed artifact collection; and generating the build metadata based on the parsed artifact collection.

18. A non-transitory computer-readable storage medium storing computer-executable instructions that, when executed, cause a processor at least to perform operations comprising:

combining a first artifact collection with a second artifact collection, wherein the first and second collections have different artifact types;

generating build metadata from the combined artifact collection, wherein the build metadata includes a manifest list;

forming logical build data from the first and second artifact collections based on the build metadata;

when no build errors are detected with the logical build data, creating a build source data for deployment;

identifying a selected build package for deployment based on a selected target computing device, wherein the selected build package is identified by a build number;

in response to the identifying, extracting the selected build package from the build source data;

when building the selected build package, generating web page content through a first handler and a second handler with different programming languages, wherein the first handler and the second handler generate first and second generated outputs, respectively, that comply with a first markup language;

transforming the first and second outputs to first and second elements, respectively, that comply with a different markup language; and injecting the first and the second elements into different sections of a rendered web page.

19. The non-transitory computer-readable storage medium of claim 18, wherein the computer-executable instructions, when executed, cause the processor to perform:

parsing the combined artifact collection;

sorting the parsed artifact collection; and generating the build metadata based on the parsed artifact collection.

20. The non-transitory computer-readable storage medium of claim 18, wherein the computer-executable instructions, when executed, cause the processor to perform:

generating, from a dictionary, deployment metadata for a selected for deployment, wherein the build metadata includes the dictionary listing all the artifacts included into a build and describing object properties of the artifacts.

* * * * *